United States Patent
Shani (10) Patent No.: US 9,485,201 B1
(45) Date of Patent: Nov. 1, 2016

(54) SYSTEM, METHOD, AND COMPUTER PROGRAM FOR PARTIALLY AUTHORIZING A MULTI-TARGET COMMUNICATION REQUEST

(71) Applicant: Amdocs Software Systems Limited, Dublin (IE)

(72) Inventor: Omer Shani, Savyon (IL)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 137 days.

(21) Appl. No.: 14/191,304

(22) Filed: Feb. 26, 2014

Related U.S. Application Data (60) Provisional application No. 61/807,354, filed on Apr. 2, 2013.

(51) Int. Cl.
*G06F 15/16* (2006.01)
*H04L 12/58* (2006.01)

(52) U.S. Cl.
CPC .................................... *H04L 51/04* (2013.01)

(58) Field of Classification Search
CPC ..... H04L 51/26; H04L 41/06; H04L 67/322; H04L 12/58; H04W 4/12; G06Q 10/107
USPC .......................................................... 709/206
See application file for complete search history.

(56) References Cited

U.S. PATENT DOCUMENTS

| | | | | |
|---|---|---|---|---|
| 8,090,667 B2 * | 1/2012 | Vallinen | ............. | G06Q 30/0283 455/406 |
| 8,401,009 B1 * | 3/2013 | Dorsey | ................. | H04L 51/066 370/389 |
| 8,996,623 B2 * | 3/2015 | Stern | .................... | G06Q 10/107 709/206 |
| 2005/0198183 A1 * | 9/2005 | Zilliacus | ............... | H04M 3/527 709/207 |
| 2006/0168049 A1 * | 7/2006 | Orozco | .................. | H04L 12/581 709/206 |
| 2008/0046988 A1 * | 2/2008 | Baharis | .................. | H04L 9/3271 726/7 |
| 2008/0091781 A1 * | 4/2008 | Haruna | ............... | H04L 12/1868 709/205 |
| 2009/0271486 A1 * | 10/2009 | Ligh | .................... | G06F 3/04886 709/206 |
| 2010/0037144 A1 * | 2/2010 | Vance | .................. | G06F 3/04817 715/739 |
| 2011/0136519 A1 * | 6/2011 | Bailey | .................. | H04L 12/5835 455/466 |

\* cited by examiner

*Primary Examiner* — Thuong Nguyen
*Assistant Examiner* — Eric Moore
(74) *Attorney, Agent, or Firm* — Zilka-Kotab, PC (57) ABSTRACT

A system, method, and computer program product are provided for partially authorizing a multi-target communication request. In use, a plurality of targets associated with a multi-target communication request are determined. Further, the multi-target communication request is automatically authorized, wherein the multi-target communication request includes a request to send at least one communication to each of the plurality of targets. Additionally, it is determined whether the multi-target communication request has been successfully authorized for each of the plurality of targets. Responsive to determining that the multi-target communication request has not been successfully authorized for at least one of the plurality of targets, the multi-target communication request is rolled back for only the at least one target.

10 Claims, 6 Drawing Sheets

SYSTEM, METHOD, AND COMPUTER PROGRAM FOR PARTIALLY AUTHORIZING A MULTI-TARGET COMMUNICATION REQUEST

CLAIM OF PRIORITY

This application claims the benefit of U.S. Provisional Application No. 61/807,354, filed Apr. 2, 2013, the entire contents of which are incorporated herein by reference.

FIELD OF THE INVENTION

The present invention relates to communication between devices, and more particularly to efficiently executing multi-target communications associated with such devices.

BACKGROUND

Telecommunication companies offer a variety of services, including Short Messaging Service (SMS) and Multimedia Messaging Service (MMS). In some cases, consumers of the SMS and/or MMS functionality may request that communications be sent to several different targets. This request may include a single request listing all the targets.

When there are limiting factors associated with the consumer's account such as, for example, balance or budget controls, the budgetary resources available to the consumer may not be sufficient to execute the request for all the targets of the request, and/or may be exhausted after executing the request for a subset of the list of targets.

With a single transaction request, the typical response from a service is to reject an entire transaction if there are insufficient resources for the entire transaction. This type of operation is not optimal for the operator or the consumer, as the consumer desires to send the message to as many targets as the remaining budget allows, and the operator desires the consumer to utilize as much of the budget as is possible.

There is thus a need for addressing these and/or other issues associated with the prior art.

SUMMARY

A system, method, and computer program product are provided for partially authorizing a multi-target communication request. In use, a plurality of targets associated with a multi-target communication request are determined. Further, the multi-target communication request is automatically authorized, wherein the multi-target communication request includes a request to send at least one communication to each of the plurality of targets. Additionally, it is determined whether the multi-target communication request has been successfully authorized for each of the plurality of targets. Responsive to determining that the multi-target communication request has not been successfully authorized for at least one of the plurality of targets, the multi-target communication request is rolled back for only the at least one target.

DETAILED DESCRIPTION

Figure 1:
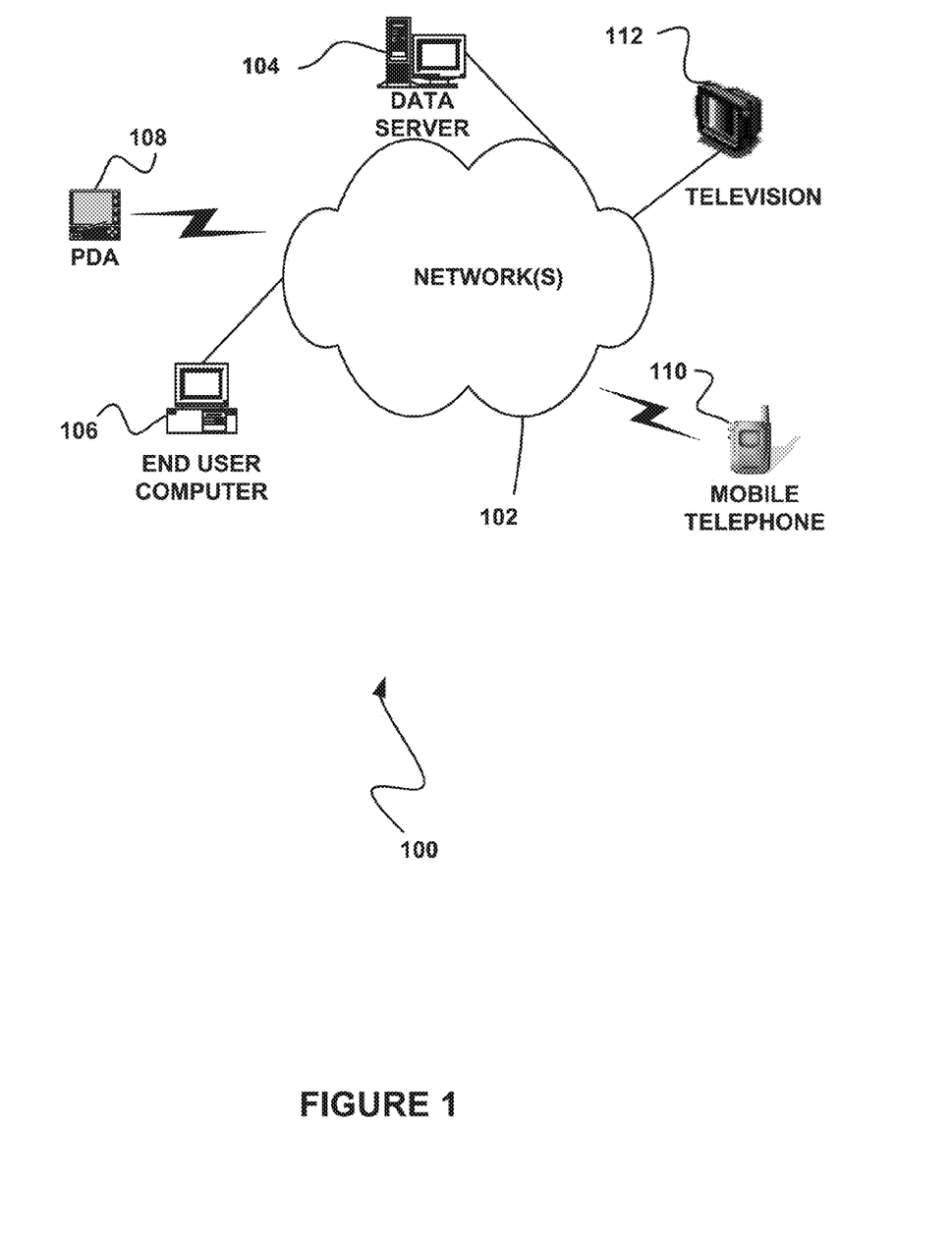
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
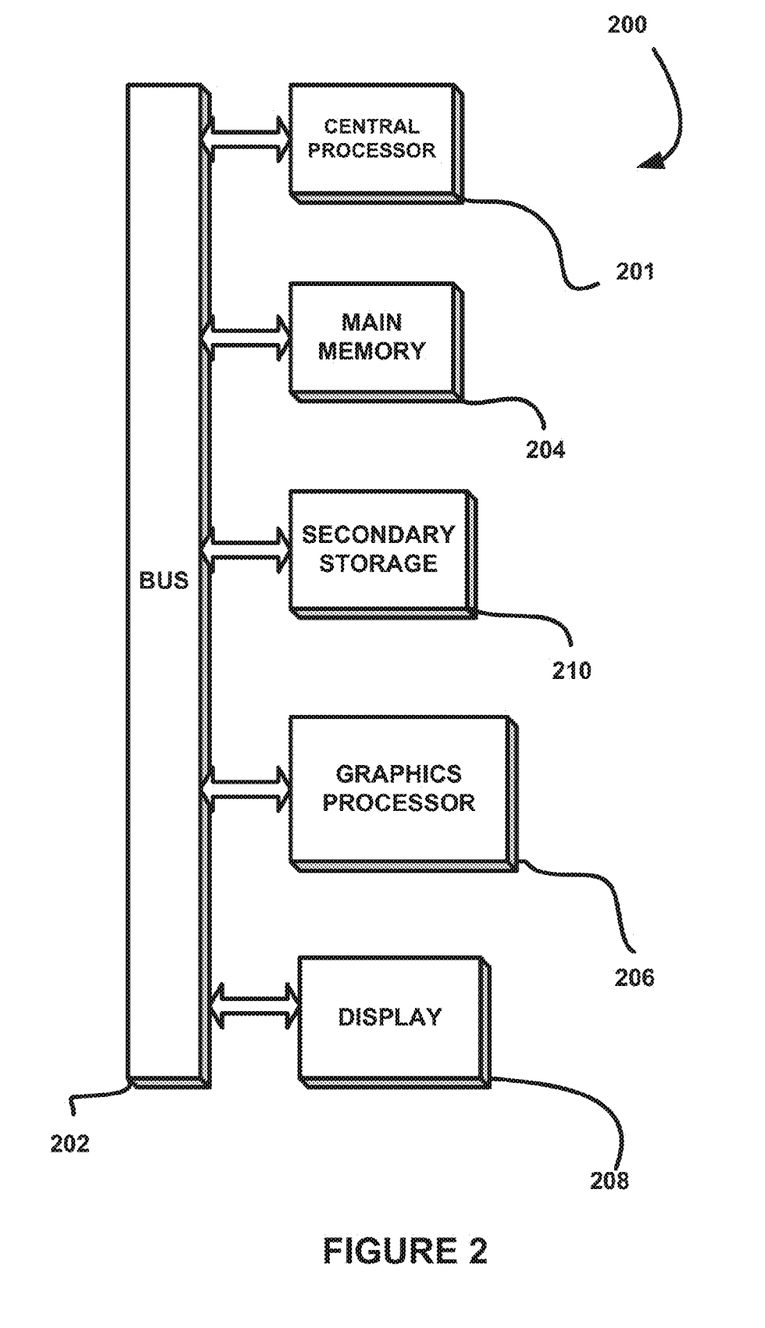
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
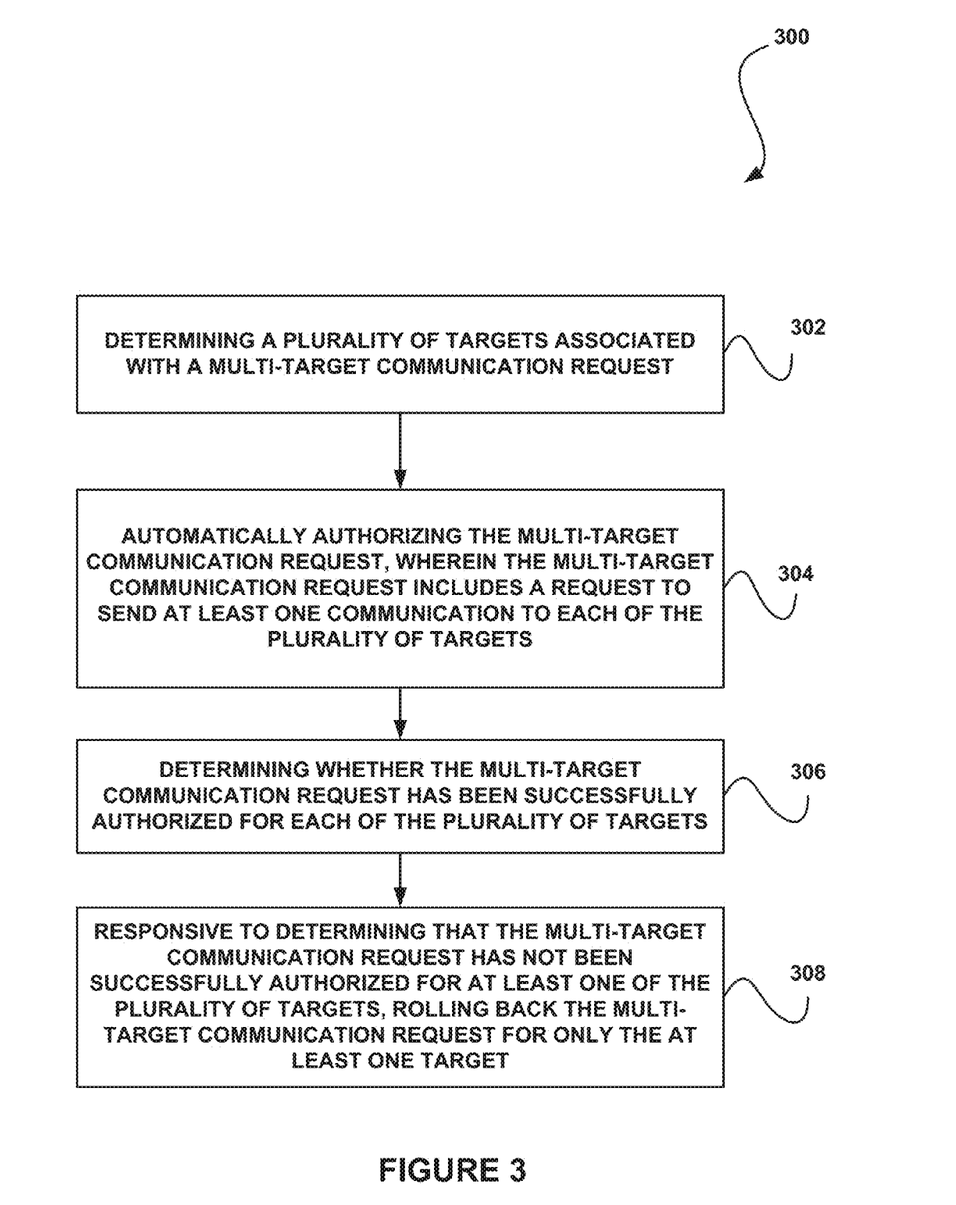
FIG. 3 illustrates a method for partially authorizing a multi-target communication request, in accordance with one embodiment.

FIG. 3 illustrates a method 300 provided for partially authorizing a multi-target communication request, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, a plurality of targets associated with a multi-target communication request are determined. See operation 302. In the context of the present description a multi-target communication request refers to any communication request associated with multiple recipients. For example, the communication request may include a request from a first device to send a message to a second device and a third device.

In various embodiments, the communication request may be associated with a variety of communication types. For example, in one embodiment, the multi-target communication request may include a multi-target short messaging service (SMS) request. In another embodiment, the multi-target communication request may include a multi-target multimedia messaging service (MMS) request. Of course, the communication request may be associated with other communication types, in various embodiments.

Further, in the context of the present description, a target refers to any intended recipient of a communication. For example, in one embodiment, the plurality of targets may include a plurality of mobile devices. In various embodiments, the mobile devices may include mobile phones, mobile computers, handheld devices, tablet computers, and/or any other mobile device capable of receiving communications.

In one embodiment, the multi-target communication request may be sent by a client device (e.g. a mobile device, etc.). In addition, in one embodiment, the multi-target communication request may be received by a host device. In various embodiments, the host device may include a service provider device (e.g. a base station, etc.), a server, a relay, and/or various other devices.

As shown further in FIG. 3, the multi-target communication request is automatically executed, where the multi-target communication request includes a request to send at least one communication to each of the plurality of targets. See operation 304. For example, in one embodiment, the multi-target communication request may include an SMS request associated with multiple targets. In this case, an SMS message may be sent to each of the targets.

As another example, the multi-target communication request may include an MMS request associated with multiple targets. In this case, an MMS message may be sent to each of the targets. Further, in one embodiment, the multi-target communication request may be associated with a single message. For example, a user may desire to send the same message to multiple other users.

In one embodiment, authorizing the multi-target communication request may include authorizing the communication to each of the targets at the same time (i.e. in parallel, etc.). In another embodiment, authorizing the multi-target communication request may include authorizing the communication to each of the targets sequentially (i.e. one at a time, etc.).

Further, in one embodiment, a user may have the ability to specify an order in which the communications are authorized (e.g. based on a user defined priority, etc.). In this case, the priority may include authorizing the communication one at a time in a prioritized order or authorizing the communication for groups of targets in a prioritized order. In this way, a user may have the ability to define a best-effort policy for the multi-target communication request by selecting a priority for authorizing communication to the plurality of targets.

As shown further in FIG. 3, it is determined whether the multi-target communication request has been successfully authorized for each of the plurality of targets. See operation 306. In various embodiments, determining whether the multi-target communication request has been successfully executed may be accomplished utilizing different techniques.

For example, in one embodiment, determining whether the multi-target communication request has been successfully authorized for each of the plurality of targets may include determining whether enough funds are present to authorize the multi-target communication request. In some cases, each target may be associated with a different cost. In other cases, each target may be associated with the same cost.

In another embodiment, determining whether the multi-target communication request has been successfully authorized for each of the plurality of targets may include determining whether the multi-target communication request has been successfully authorized for each of the plurality of targets sequentially. For example, a communication may be authorized for a first target. The communication may then be authorized for a second target.

In another embodiment, determining whether the multi-target communication request has been successfully authorized for each of the plurality of targets may include determining whether the multi-target communication request has been successfully authorized for each of the plurality of targets in parallel. For example, a communication may be attempted to be authorized for all of the targets and it may be determined whether the authorization of the communication request was successful for all the targets.

Further, responsive to determining that the multi-target communication request has not been successfully authorized for at least one of the plurality of targets, the multi-target communication request is rolled back for only the at least one target. See operation 308. For example, if authorization for one or more of the targets is unsuccessful, those particular communication requests may be rolled back and the communication requests for the remaining targets may be allowed to proceed (i.e. authorized). In this way, if authorization of communication requests for one or more targets in a group of targets fails, the multi-target communication will have the potential to be authorized for the other and be a partial success.

For example, a communication request may be successfully authorized for a first and second target, but not a third target. If the communications are authorized in a sequential manner, a communication request to a fourth target may still be automatically authorized, even though the communication request authorization for the third target was a failure.

Similarly, the communication requests for the first, second, third, and fourth target may be authorized in parallel, and the communication request for the third target may be the only authorization failure. In this case, the communication request for three of the targets would still be successful. As one example, the multi-target communication request may not have been successfully authorized for a target because of a technical issue. As another example, the multi-target communication request may not have been successfully authorized for a target because of a budgetary issue (e.g. it would cost too much to send the communication to a particular target, or all of the targets, etc.).

In the context of the present description, rolling back a communication request refers to any technique that functions to obviate a failed communication request attempt. For example, in one embodiment, rolling back a communication request may include retracting a communication request. In another embodiment, rolling back a communication request may include ignoring a communication request failure. In another embodiment, rolling back a communication request may include deleting a communication request after a failure. Of course, in various embodiments, rolling back a communication request may include any technique of functioning to allow a system to continue communication to intended targets when communication with one target is a failure.

In one embodiment, a partial success list indicating the plurality of targets for which the communication request has been successfully authorized may be created automatically (e.g. by a host, etc.). As an option, the partial success list may be sent to a client device that initiated the multi-target communication request.

In another embodiment, a failure list indicating the at least one of the plurality of targets for which the at least one of the plurality of targets communication request has not been successfully authorized may be created automatically (e.g. by a host, etc.). In this case, the failure list may be sent to a client device that initiated the multi-target communication request.

In one embodiment, the failure list and/or the success list may be sent to the client device in the same form as the original communication. For example, in one embodiment, if the multi-target communication request is associated with an MMS request, the list(s) may be sent to the client in the form of an MMS message. Similarly, if the multi-target communication request is associated with an SMS request, the list(s) may be sent to the client in the form of an SMS message.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
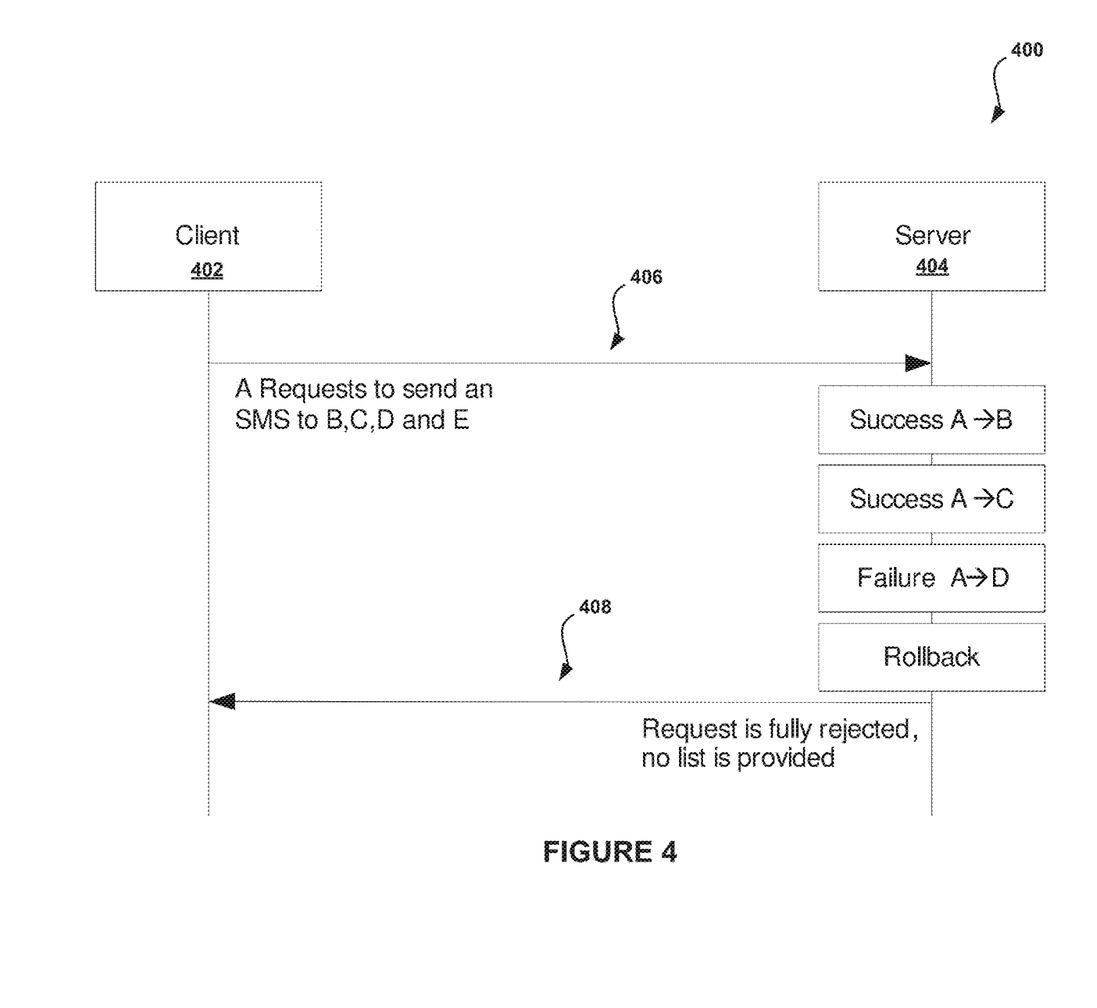
FIG. 4 illustrates a system flow diagram for authorizing a multi-target communication request, in accordance with one example.

FIG. 4 illustrates a system flow diagram 400 for authorizing a multi-target communication request, in accordance with one example. The aforementioned definitions may equally apply to the description below.

As shown, a client device 402 ("Client A") sends a multi-target communication request to a server 404. In one embodiment, the client device 402 may include a consumer device associated with a service provider. Further, in one embodiment, the server 404 may represent a service provider server.

As shown, the request is sent with four specified recipients, devices B, C, D, and E. See operation 406. In this example, the communication between A and B is successful. Further, the communication between A and C is successful. However, the communication between A and D is unsuccessful.

Accordingly, in this example, recipient D proves to be costly. For example, recipient D may belong to another network, etc. In this example, the communication process stops when the limiting factor of D is calculated, and the entire transaction fails and is rolled back, even though B and C were processed successfully. Thus, the flow diagram 400 represents a flow of a multiple service request as defined in an all-or-nothing situation. In some cases, the client 402 may receive an indication that the entire request was not satisfied. See operation 408.

In many consumer settings, a similar service may be requested by the consumer with regard to several targets. Such situations may be, for example, ordering a multi-course meal in a restaurant or testing blood in a batch of samples, etc.

In a consumer cellular telephony environment, for example, the requested service may be to send an identical SMS or MMS to a set of users. These users do not need to be identical, and in most cases they are not, and like ordering in a restaurant, each service for a specific target may entail a different cost.

Figure 5:
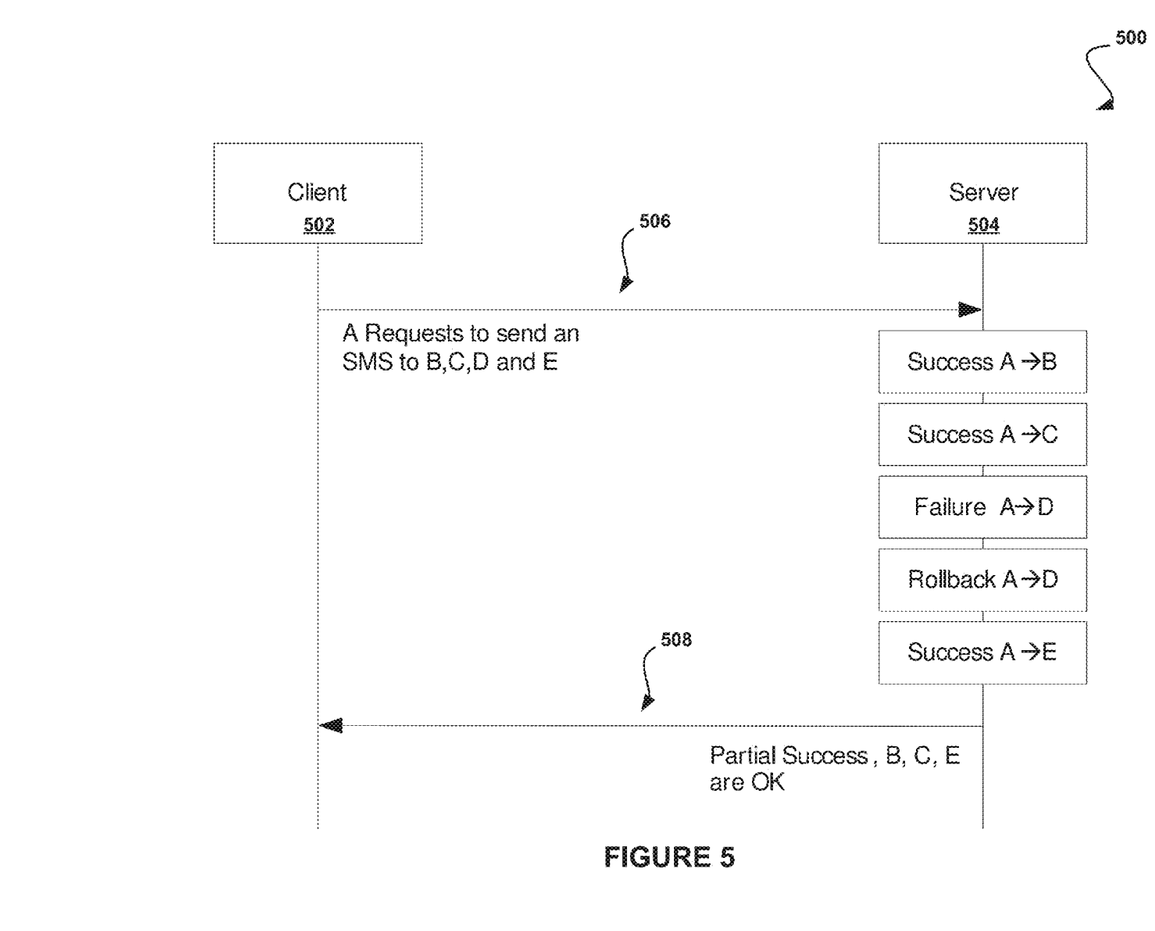
FIG. 5 illustrates a system flow diagram for authorizing a multi-target communication request, in accordance with one embodiment.

As an example, if the decision to order from a specific restaurant is based on a predefined budget, the requestor may find in the middle of ordering that a predefined budget has been exhausted. In this case there are two options. A person may cancel the entire order (e.g. working in an all-or-nothing mode, as shown in FIG. 4), or the person may make the most out of the budget (e.g. working in a best-effort mode, as shown in FIG. 5).

In the context of a telephony system, when the request is requested by the sender without knowing in advance the cost of each of the services, it may be determined, while calculating the cost of the order, that the budget is exhausted. Since the message was requested as a single transaction, requiring a single result, the response in these cases may be a rejection of the entire request.

In the case of an SMS, insufficient budget for one of the recipients may cause the failure of all the SMS messages.

Accordingly, the techniques described herein may function to provide partial roll-backs to create a partial success list, and to provide the requester with a list of the successful targets. By being able to process each and every recipient as a sub-transaction and attempting to process all of them, a best effort result for the entire transaction may be computed. In one embodiment, this best-effort policy may be defined by the operator.

The policy may be, for example, to execute as many sub-transactions as possible, to utilize most of the available budget, to execute by order of entry in the request, or by a "family first" rule. Calculating the best effort may then result in a more satisfactory service to the end user.

FIG. 5 illustrates a system flow diagram 500 for authorizing a multi-target communication request, in accordance with one embodiment. As an option, the flow diagram 500 may be implemented in the context of the details of FIGS. 1-4. Of course, however, the flow diagram 500 may be implemented in the context of any desired environment. Further, the aforementioned definitions may equally apply to the description below.

As shown, a client device 502 ("Client A") sends a multi-target communication request to a server 504. In one embodiment, the client device 502 may include a consumer device associated with a service provider. Further, in one embodiment, the server 504 may represent a service provider server.

As shown, the request is sent with four specified recipients, devices B, C, D, and E. See operation 506. In this example, the communication between A and B is successful. Further, the communication between A and C is successful. However, the communication between A and D is unsuccessful.

In this case, the server 504 rolls back only the sub-transaction associated with client D, and continues sending the communication to recipient E. Hence, the server 504 is able to also accept the E recipient. In one embodiment, a list may be provided with the information of what was successful and what is not. See operation 508. For example, in one embodiment, a partial success list may be sent to the client device 502.

FIG. 5 illustrates an example in which the various requests may be processed sequentially. In this example, execution (i.e. authorization) of at least some of the various requests may be at least partially interdependent and therefore may be computed sequentially. Upon failure of a particular task, such as failing to authorize an SMS message from A to D, this particular request is rolled back, while additional subsequent requests, such as sending an SMS from A to E, are authorized.

Figure 6:
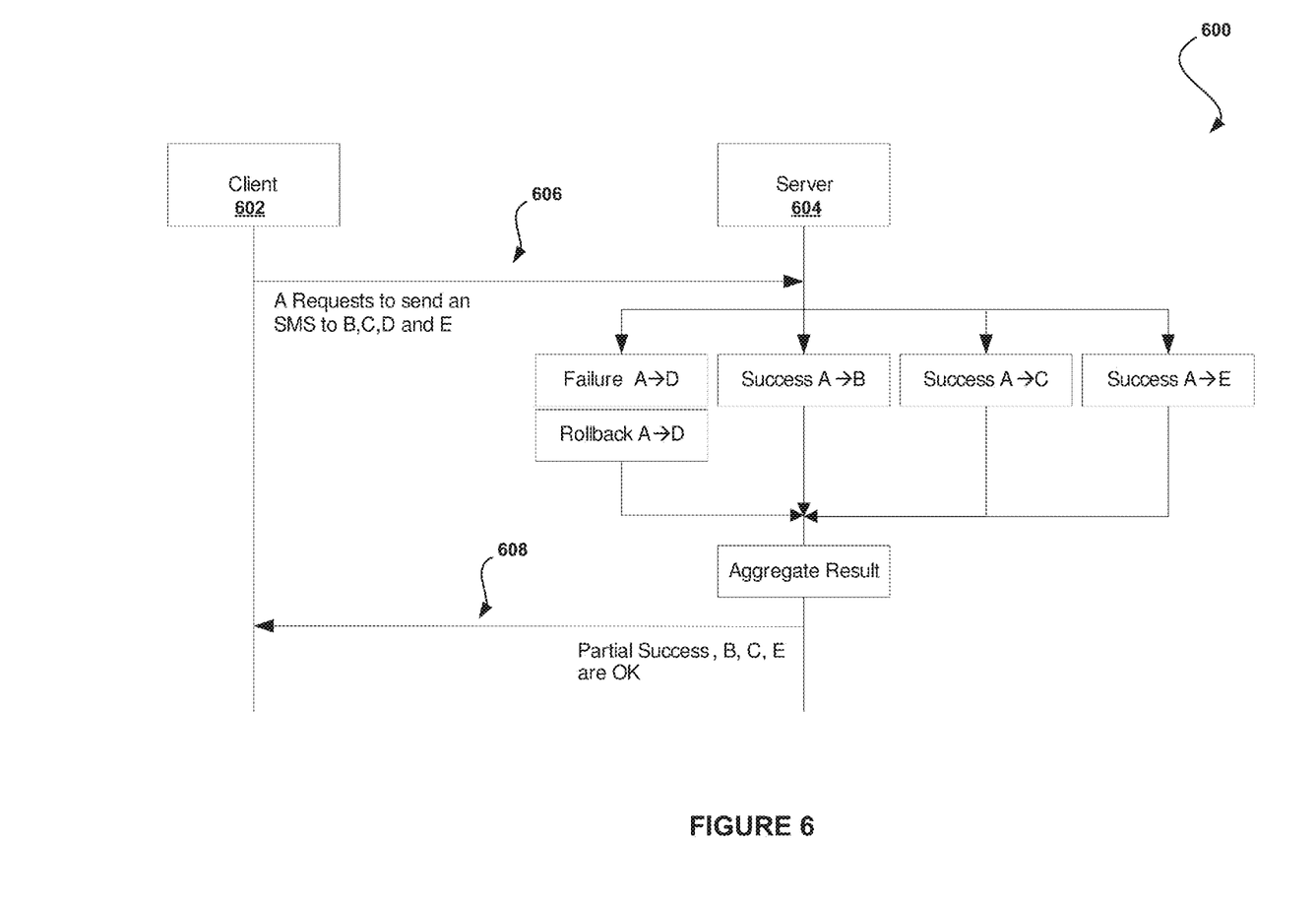
FIG. 6 illustrates a system flow diagram for authorizing a multi-target communication request, in accordance with one embodiment.

FIG. 6 illustrates a system flow diagram 600 for authorizing a multi-target communication request, in accordance with one embodiment. As an option, the flow diagram 600 may be implemented in the context of the details of FIGS. 1-5. Of course, however, the flow diagram 600 may be implemented in the context of any desired environment. Further, the aforementioned definitions may equally apply to the description below.

As shown, a client device 602 ("Client A") sends a multi-target communication request to a server 604. In one embodiment, the client device 602 may include a consumer device associated with a service provider. Further, in one embodiment, the server 604 may represent a service provider server.

As shown, the request is sent with four specified recipients, devices B, C, D, and E. See operation 606. In this example, the communication between A and B is successful. Further, the communication between A and C is successful. The communication between A and D is unsuccessful. However, in this case, the system flow diagram 600 illustrates a parallel processing of a split request into sub-transactions, so that each is treated separately, and, in one embodiment, the result may be determined according to the policy defined by the operator. Accordingly, the communication between A and E is also successful, in parallel with the other successes (and failure(s), etc.).

Thus, a system implementing the techniques illustrated in FIG. 6 will allow various requests to be processed in parallel. It is appreciated that parallel processing may be executed in a case where the various tasks do not compete for the same resources, or in a case where a particular failure is due to a technical failure of a particular task, in which failure does not impact any of the parallel tasks. For example, a particular SMS (e.g. such as sending an SMS from A to D in this example, etc.) may be addressed to a non-existent telephone number.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:
   receiving a request to send a communication to a plurality of targets as a single transaction; in response to the request, creating a plurality of sub-transactions, each of the sub-transactions specifying a different one of the targets and being for sending the message to the specified target;
   determining whether enough funds are present to cover a cost of sending the communication to all of the targets;
   when it is determined that enough funds are present to cover a cost of sending the communication to all of the targets, automatically processing the sub-transactions to send the communication to all of the targets;
   when it is determined that enough funds are not present to cover a cost of sending the communication to all of the targets:
   automatically selecting in accordance with a predefined policy a subset of the sub-transactions for which enough funds are present to cover a cost of sending the communication to the targets specified thereby, wherein the predefined policy specifies to select as the subset a highest number of the sub-transactions as possible within an amount of the funds that are available,
   automatically processing the sub-transactions in the subset to send the communication to the targets specified by the sub-transactions in the subset, and
   rolling back the remaining sub-transactions not included in the subset such that the communication is not sent to the targets specified by the remaining sub-transactions.

2. The computer program product of claim 1, wherein the communicated requested is a short messaging service (SMS) message.

3. The computer program product of claim 1, wherein the communication requested is a multimedia messaging service (MMS) message.

4. The computer program product of claim 1, wherein the targets are mobile devices.

5. The computer program product of claim 4, wherein the mobile devices are mobile phones.

6. The computer program product of claim 1, wherein the request is sent by a client device.

7. The computer program product of claim 1, wherein the computer code is adapted to be executed by a computer.

8. The computer program product of claim 1, further comprising computer code for:
   creating a failure list indicating the targets specified by the rolled-back sub-transactions; and
   sending the failure list to a client device that initiated the request.

9. A method, comprising:
   receiving a request to send a communication to a plurality of targets as a single transaction; in response to the request, creating a plurality of sub-transactions, each of the sub-transactions specifying a different one of the targets and being for sending the message to the specified target;
   determining whether enough funds are present to cover a cost of sending the communication to all of the targets;
   when it is determined that enough funds are present to cover a cost of sending the communication to all of the targets, automatically processing the sub-transactions to send the communication to all of the targets;
   when it is determined that enough funds are not present to cover a cost of sending the communication to all of the targets:
   automatically selecting in accordance with a predefined policy a subset of the sub-transactions for which enough funds are present to cover a cost of sending the communication to the targets specified thereby, wherein the predefined policy specifies to select as the subset a highest number of the sub-transactions as possible within an amount of the funds that are available,
   automatically processing the sub-transactions in the subset to send the communication to the targets specified by the sub-transactions in the subset, and rolling back the remaining sub-transactions not included in the subset such that the communication is not sent to the targets specified by the remaining sub-transactions.

10. A system comprising:

a memory; and a processor coupled to the memory and that is configured for:

receiving a request to send a communication to a plurality of targets as a single transaction; in response to the request, creating a plurality of sub-transactions, each of the sub-transactions specifying a different one of the targets and being for sending the message to the specified target;

determining whether enough funds are present to cover a cost of sending the communication to all of the targets;

when it is determined that enough funds are present to cover a cost of sending the communication to all of the targets, automatically processing the sub-transactions to send the communication to all of the targets;

when it is determined that enough funds are not present to cover a cost of sending the communication to all of the targets:

automatically selecting in accordance with a predefined policy a subset of the sub-transactions for which enough funds are present to cover a cost of sending the communication to the targets specified thereby, wherein the predefined policy specifies to select as the subset a highest number of the sub-transactions as possible within an amount of the funds that are available,          automatically processing the sub-transactions in the subset to send the communication to the targets specified by the sub-transactions in the subset, and          rolling back the remaining sub-transactions not included in the subset such that the communication is not sent to the targets specified by the remaining sub-transactions.

\* \* \* \* \*